United States Patent
Williams et al.

(10) Patent No.: US 10,562,418 B2
(45) Date of Patent: Feb. 18, 2020

(54) LOAD LEG AND CHILD SAFETY SEAT ASSEMBLY THEREWITH

(71) Applicant: Wonderland Switzerland AG, Steinhausen (CH)

(72) Inventors: Bruce Williams, Narvon, PA (US); Gregory Sellers, Christiana, PA (US)

(73) Assignee: Wonderland Switzerland AG, Steinhausen (CH)

( * ) Notice: Subject to any disclaimer, the term of this patent is extended or adjusted under 35 U.S.C. 154(b) by 134 days.

(21) Appl. No.: 15/703,994

(22) Filed: Sep. 14, 2017

(65) Prior Publication Data

US 2018/0079331 A1 Mar. 22, 2018

Related U.S. Application Data

(60) Provisional application No. 62/395,706, filed on Sep. 16, 2016.

(51) Int. Cl.
| | |
|---|---|
| *B60N 2/28* | (2006.01) |
| *B60N 2/50* | (2006.01) |
| *B60N 2/72* | (2006.01) |

(52) U.S. Cl.
CPC ......... *B60N 2/2824* (2013.01); *B60N 2/2812* (2013.01); *B60N 2/2845* (2013.01);
(Continued)

(58) Field of Classification Search
CPC .. B60N 2/2812; B60N 2/2824; B60N 2/2845; B60N 2/2851; B60N 2/2863;
(Continued)

(56) References Cited

U.S. PATENT DOCUMENTS

| | | | | |
|---|---|---|---|---|
| 5,186,520 A | * | 2/1993 | Whitaker | B60N 2/2803 24/136 R |
| 5,432,985 A | * | 7/1995 | Bernart | A44B 11/04 24/200 |

(Continued)

FOREIGN PATENT DOCUMENTS

| | | |
|---|---|---|
| CN | 1346616 A | 5/2002 |
| CN | 1348887 A | 5/2002 |

(Continued)

*Primary Examiner* — James M Ference
(74) *Attorney, Agent, or Firm* — Winston Hsu

(57) ABSTRACT

A load leg adapted for a child safety seat includes a first telescoping member, a second telescoping member, a third telescoping member, a first engaging assembly, a second engaging assembly, and an operating member. The first engaging assembly is movably disposed on the first telescoping member for engaging with or disengaging from the second telescoping member. The second engaging assembly is movably disposed on the second telescoping member for engaging with or disengaging from the third telescoping member. The operating member is for driving the first engaging assembly and the second engaging assembly simultaneously to allow relative sliding movement of the first telescoping member and the second telescoping member and relative sliding movement of the second telescoping member and the third telescoping member at the same time, which provides a convenient way to extend the load leg between the child safety seat and a floor of a vehicle.

14 Claims, 8 Drawing Sheets

(52) U.S. Cl.
CPC ......... *B60N 2/2851* (2013.01); *B60N 2/2863* (2013.01); *B60N 2/2881* (2013.01); *B60N 2/505* (2013.01); *B60N 2/72* (2013.01)

(58) Field of Classification Search
CPC ........ B60N 2/2881; B60N 2/505; B60N 2/72; B60N 2/26; B60N 2/28; B60N 2/2803
See application file for complete search history.

(56) References Cited

U.S. PATENT DOCUMENTS

| | | | | |
|---|---|---|---|---|
| 5,487,588 | A * | 1/1996 | Burleigh | B60N 2/2806 297/250.1 |
| 5,522,639 | A * | 6/1996 | Jaime | B60N 2/28 297/183.3 |
| 5,611,596 | A * | 3/1997 | Barley | B60N 2/2806 297/256.13 |
| 5,685,603 | A * | 11/1997 | Lane, Jr. | B60N 2/2821 297/216.11 |
| 5,876,011 | A * | 3/1999 | Blasing | F16M 11/28 248/170 |
| 6,099,072 | A * | 8/2000 | Sturt | B60N 2/3011 296/65.09 |
| 6,152,525 | A * | 11/2000 | Carine | B60N 2/2821 108/9 |
| 6,152,528 | A * | 11/2000 | van Montfort | A44B 11/08 297/250.1 |
| 6,474,735 | B1 * | 11/2002 | Carnahan | B60N 2/2803 297/250.1 |
| 6,508,510 | B2 * | 1/2003 | Yamazaki | B60N 2/2806 297/250.1 |
| 6,517,153 | B1 * | 2/2003 | Brewer | A47C 7/66 297/184.1 |
| 6,672,664 | B2 * | 1/2004 | Yanaka | B60N 2/2806 24/134 KB |
| 6,676,212 | B1 * | 1/2004 | Amirault | A47C 1/03 297/250.1 |
| 6,702,384 | B1 * | 3/2004 | Brown | A47C 3/38 182/204 |
| 6,783,135 | B1 * | 8/2004 | Nord | B60N 2/2806 280/30 |
| 6,857,700 | B2 * | 2/2005 | Eastman | B60N 2/2806 297/250.1 |
| 6,860,557 | B2 * | 3/2005 | Jonasson | B60N 2/26 297/253 |
| 6,916,066 | B2 | 7/2005 | Sedlack | |
| 6,979,057 | B2 | 12/2005 | Sedlack | |
| 7,163,265 | B2 * | 1/2007 | Adachi | B60N 2/2806 297/250.1 |
| 7,231,676 | B2 * | 6/2007 | Cloer | A47C 19/024 108/147.19 |
| 7,438,358 | B2 * | 10/2008 | Santamaria | A47D 13/02 297/256.1 |
| 7,472,955 | B2 * | 1/2009 | Crane | B60N 2/2806 297/250.1 |
| 7,495,359 | B2 * | 2/2009 | Klinke | A47B 9/04 310/51 |
| 7,549,702 | B2 * | 6/2009 | Meyers | A47K 3/122 297/16.1 |
| 7,926,874 | B2 * | 4/2011 | Hendry | B60N 2/2806 297/250.1 |
| 7,988,230 | B2 * | 8/2011 | Heisey | B60N 2/2821 297/250.1 |
| 8,262,161 | B2 * | 9/2012 | Fritz | B60N 2/2806 297/253 |
| 8,322,788 | B2 * | 12/2012 | Williams | B60N 2/2806 297/256.16 |
| 8,567,862 | B2 * | 10/2013 | Williams | B60N 2/2806 297/188.13 |
| 8,573,695 | B2 * | 11/2013 | Van Geer | B60N 2/2806 297/256.16 |
| 8,845,022 | B2 * | 9/2014 | Strong | B60N 2/2824 297/256.16 |
| 8,870,285 | B2 * | 10/2014 | Williams | B60N 2/2821 297/256.13 |
| 8,973,991 | B2 * | 3/2015 | Wuerstl | B60N 2/2806 297/253 |
| 8,973,992 | B2 * | 3/2015 | Guo | B60N 2/2806 24/68 R |
| 8,979,198 | B2 | 3/2015 | Williams | |
| 9,156,379 | B2 * | 10/2015 | Williams | B60N 2/2821 |
| 9,162,593 | B2 * | 10/2015 | Spence | B60N 2/265 |
| 9,174,554 | B2 * | 11/2015 | Maciejczyk | B60N 2/265 |
| 9,308,838 | B2 * | 4/2016 | Miller | B60N 2/2821 |
| 9,315,124 | B2 * | 4/2016 | Lehman | B60N 2/2806 |
| 9,365,135 | B2 * | 6/2016 | Carpenter | B60N 2/2821 |
| 9,365,145 | B2 * | 6/2016 | Millasseau | B60N 3/063 |
| 9,499,074 | B2 * | 11/2016 | Strong | B60N 2/2806 |
| 9,598,025 | B1 * | 3/2017 | Scheppegrell | B60N 2/90 |
| 9,937,823 | B2 * | 4/2018 | Williams | B60N 2/2812 |
| 9,963,051 | B2 | 5/2018 | Strong | |
| 10,023,079 | B2 * | 7/2018 | Zhao | B60N 2/2806 |
| 10,035,436 | B2 * | 7/2018 | Zhou | B60N 2/2806 |
| 2002/0113470 | A1 * | 8/2002 | Kain | B60N 2/2806 297/256.16 |
| 2003/0151286 | A1 * | 8/2003 | Kain | B60N 2/2806 297/256.16 |
| 2003/0164632 | A1 * | 9/2003 | Sedlack | A47D 13/02 297/256.16 |
| 2004/0041448 | A1 * | 3/2004 | Takizawa | B60N 2/2812 297/216.11 |
| 2004/0070244 | A1 * | 4/2004 | Williams | B60N 2/2851 297/250.1 |
| 2005/0110318 | A1 * | 5/2005 | Meeker | B60N 2/2812 297/256.16 |
| 2005/0168023 | A1 * | 8/2005 | Gangadharan | A47D 13/02 297/250.1 |
| 2006/0012234 | A1 * | 1/2006 | Collias | B60N 2/2806 297/423.38 |
| 2006/0055218 | A1 * | 3/2006 | Barker | B60N 2/2803 297/250.1 |
| 2007/0069562 | A1 * | 3/2007 | Van Montfort | B60N 2/286 297/253 |
| 2007/0236053 | A1 * | 10/2007 | West | A47C 16/00 297/4 |
| 2008/0030052 | A1 * | 2/2008 | Chen | B60N 2/2824 297/188.02 |
| 2008/0277984 | A1 * | 11/2008 | Carine | B60N 2/2806 297/253 |
| 2008/0303321 | A1 * | 12/2008 | Powell | B60N 2/2824 297/216.11 |
| 2008/0315647 | A1 * | 12/2008 | Carine | B60N 2/2824 297/250.1 |
| 2009/0165207 | A1 * | 7/2009 | Reed | A61G 1/013 5/611 |
| 2009/0165208 | A1 * | 7/2009 | Reed | A61G 1/052 5/611 |
| 2009/0222988 | A1 * | 9/2009 | Reed | A61G 1/0567 5/627 |
| 2010/0052384 | A1 * | 3/2010 | Yang | B60N 2/2824 297/253 |
| 2010/0133303 | A1 * | 6/2010 | Schilly | A45F 3/10 224/155 |
| 2011/0057489 | A1 * | 3/2011 | Greene | B60N 2/2806 297/253 |
| 2011/0233374 | A1 * | 9/2011 | Clement | B60N 2/2821 248/542 |
| 2011/0254331 | A1 * | 10/2011 | Nagelski | B60N 2/2806 297/216.11 |
| 2012/0119457 | A1 * | 5/2012 | Williams | B60N 2/2821 280/30 |
| 2013/0015300 | A1 * | 1/2013 | Klinke | A47B 9/20 248/49 |
| 2013/0307300 | A1 * | 11/2013 | Pos | B60N 2/2812 297/216.12 |
| 2014/0001800 | A1 * | 1/2014 | Mo | B60N 2/2824 297/216.11 |
| 2014/0203605 | A1 * | 7/2014 | Cheng | B60N 2/2809 297/250.1 |

(56) References Cited

U.S. PATENT DOCUMENTS

| | | | |
|---|---|---|---|
| 2014/0232152 A1* | 8/2014 | Minato | B60N 2/2809 297/216.11 |
| 2014/0265480 A1* | 9/2014 | Perrin | B60N 2/26 297/217.4 |
| 2014/0265489 A1* | 9/2014 | Morgenstern | B60N 2/2812 297/256.15 |
| 2015/0076878 A1* | 3/2015 | Santamaria | B60N 2/2824 297/256.13 |
| 2015/0091343 A1* | 4/2015 | Cheng | B60N 2/2821 297/216.11 |
| 2016/0200225 A1* | 7/2016 | Van Der Veer | B60N 2/2812 297/256.16 |
| 2016/0278531 A1* | 9/2016 | Webb | A47C 9/10 |
| 2016/0311345 A1* | 10/2016 | Morgenstern | B60N 2/2806 |
| 2016/0318425 A1* | 11/2016 | Hjerpe | B60N 2/2824 |
| 2016/0347210 A1* | 12/2016 | Mason | B60N 2/2806 |
| 2016/0347212 A1* | 12/2016 | Mason | B60N 2/2806 |
| 2017/0240072 A1 | 8/2017 | Wright | |
| 2017/0355287 A1 | 12/2017 | Anderson | |
| 2018/0056822 A1 | 3/2018 | Anderson | |

FOREIGN PATENT DOCUMENTS

| | | |
|---|---|---|
| CN | 1382602 A | 12/2002 |
| CN | 101284501 A | 10/2008 |
| CN | 101386275 A | 3/2009 |
| CN | 101508255 A | 8/2009 |
| CN | 203254992 U | 10/2013 |
| CN | 103661024 A | 3/2014 |
| CN | 203864487 U | 10/2014 |
| CN | 104527469 A | 4/2015 |
| CN | 204526882 U | 8/2015 |
| CN | 105329123 A | 2/2016 |
| CN | 205468637 U | 8/2016 |
| CN | 205573679 U | 9/2016 |
| EP | 1 393 967 A1 | 3/2004 |
| FR | 2 928 882 A1 | 9/2009 |
| JP | 2016-7933 A | 1/2016 |

* cited by examiner

LOAD LEG AND CHILD SAFETY SEAT ASSEMBLY THEREWITH

CROSS REFERENCE TO RELATED APPLICATIONS

This application claims the benefit of U.S. Provisional Patent Application No. 62/395,706 filed on Sep. 16, 2016, which is hereby incorporated by reference in its entirety.

BACKGROUND OF THE INVENTION

1. Field of the Invention

The present invention relates to a children's product, and more particularly, to a load leg which has advantages of wide-range adjustment and easy operation, and a child safety seat assembly therewith.

2. Description of the Prior Art

A child safety seat is specifically designed to protect children from injury or death during collisions. The child safety seat usually can be installed on a vehicle in a forward-facing position or a rear-facing position. In order to prevent the forward moment and rotation of the child safety seat during collisions, a top tether of the child safety seat can be combined with a seat belt of the vehicle when the child safety seat is in the forward-facing position. On the other hands, since the top tether is not effective or available when the child safety seat is in the rear-facing position, a load leg of the child safety seat can extend to a floor of the vehicle for providing support. However, there is a need to design the load leg with an adjustable length to fit with different types of vehicles.

SUMMARY OF THE INVENTION

Therefore, it is an objective of the present invention to provide a load leg which has advantages of wide range adjustment and easy operation, and a child safety seat assembly therewith.

In order to achieve the aforementioned objective, the present invention discloses a load leg adapted for a child safety seat. The load leg includes a first telescoping member, a second telescoping member, a third telescoping member, a first engaging assembly, a second engaging assembly, and an operating member. The first telescoping member is for abutting against a grounding surface. The second telescoping member is slidably disposed on the first telescoping member. The third telescoping member is slidably disposed on the second telescoping member and fixedly connected to the child safety seat. The first engaging assembly is movably disposed on the first telescoping member for engaging with second telescoping member to restrain the first telescoping member and the second telescoping member from sliding relative to each other or disengaging from the second telescoping member to allow the first telescoping member and the second telescoping member to slide relative to each other. The second engaging assembly is movably disposed on the second telescoping member for engaging with third telescoping member to restrain the second telescoping member and the third telescoping member from sliding relative to each other or disengaging from the third telescoping member to allow the second telescoping member and the third telescoping member to slide relative to each other. The operating member is connected to the first engaging assembly and the second engaging assembly for driving the first engaging assembly to disengage from the second telescoping member and for driving the second engaging assembly to disengage from the third telescoping member simultaneously.

According to an embodiment of the present invention, the first engaging assembly and the second engaging assembly are misaligned with each other along a direction substantially perpendicular to sliding directions of the second telescoping member and the third telescoping member.

According to an embodiment of the present invention, the load leg further includes a first linking member and a second linking member. The operating member is connected to the first engaging assembly by the first linking member, and the operating member is connected to the second engaging assembly by the second linking member.

According to an embodiment of the present invention, the first linking member and the second linking member are cables.

According to an embodiment of the present invention, the first engaging assembly includes a first housing and a first engaging pawl. The first housing is fixed on the first telescoping member. The first engaging pawl is pivoted to the first housing and connected to the first linking member. The second engaging assembly includes a second housing and a second engaging pawl. The second housing is fixed on the second telescoping member, and the second engaging pawl is pivoted to the second housing and connected to the second linking member.

According to an embodiment of the present invention, a plurality of first engaging portions is formed on the second telescoping member and along a sliding direction of the second telescoping member. A plurality of second engaging portions is formed on the third telescoping member and along a sliding direction of the third telescoping member. The operating member drives the first engaging pawl to pivotally disengage from one of the plurality of first engaging portions on the second telescoping member and drives the second engaging pawl to pivotally disengage from one of the plurality of second engaging portions on the third telescoping member simultaneously.

According to an embodiment of the present invention, the first engaging assembly and the second engaging assembly are located at two opposite sides, and the plurality of first engaging portions and the plurality of second engaging portions are located at two opposite sides.

According to an embodiment of the present invention, the first engaging assembly further includes a first recovering member abutting against the first engaging pawl for biasing the first engaging pawl to engage with the one of the plurality of first engaging portions formed on the second telescoping member, and the second engaging assembly further includes a second recovering member abutting against the second engaging pawl for biasing the second engaging pawl to engage with the one of the plurality of second engaging portions formed on the third telescoping member.

According to an embodiment of the present invention, the first engaging assembly includes a first housing, a first driving member, and a first engaging pawl. The first housing is fixed on the first telescoping member. The first driving member is connected to the first linking member. A first sliding slot is formed on the first housing. A longitudinal direction of the first sliding slot is substantially perpendicular to a sliding direction of the second telescoping member. A first driving slot is formed on the first driving member. A longitudinal direction of the first driving slot is inclined relative to the longitudinal direction of the first sliding slot, and the first engaging pawl includes a first protruding column passing through the first driving slot and the first sliding slot and a first pawl portion connected to the first protruding column.

According to an embodiment of the present invention, the second engaging assembly includes a second housing, a second driving member, and a second engaging pawl. The second housing is fixed on the second telescoping member. The second driving member is connected to the second linking member. A second sliding slot is formed on the second housing. A longitudinal direction of the second sliding slot is substantially perpendicular to a sliding direction of the third telescoping member. A second driving slot is formed on the second driving member. A longitudinal direction of the second driving slot is inclined relative to the longitudinal direction of the second sliding slot, and the second engaging pawl includes a second protruding column passing through the second driving slot and the second sliding slot and a second pawl portion connected to the second protruding column.

According to an embodiment of the present invention, a plurality of first engaging portions is formed on the second telescoping member and along a sliding direction of the second telescoping member. A plurality of second engaging portions is formed on the third telescoping member and along a sliding direction of the third telescoping member. The operating member drives the first engaging pawl to pivotally disengage from one of the plurality of first engaging portions on the second telescoping member and drives the second engaging pawl to pivotally disengage from one of the plurality of second engaging portions on the third telescoping member simultaneously.

According to an embodiment of the present invention, the first engaging assembly further includes a first recovering member connected between the first housing and the first driving member, and the second engaging assembly further includes a second recovering member connected between the second housing and the second driving member.

According to an embodiment of the present invention, the operating member is disposed on the first telescoping member.

In order to achieve the aforementioned objective, the present invention further discloses a child safety seat assembly. The child safety seat assembly includes a child safety seat and a load leg for supporting the child safety seat. The load leg includes a first telescoping member, a second telescoping member, a third telescoping member, a first engaging assembly, a second engaging assembly, and an operating member. The first telescoping member is for abutting against a grounding surface. The second telescoping member is slidably disposed on the first telescoping member. The third telescoping member is slidably disposed on the second telescoping member and fixedly connected to the child safety seat. The first engaging assembly is movably disposed on the first telescoping member for engaging with second telescoping member to restrain the first telescoping member and the second telescoping member from sliding relative to each other or disengaging from the second telescoping member to allow the first telescoping member and the second telescoping member to slide relative to each other. The second engaging assembly is movably disposed on the second telescoping member for engaging with third telescoping member to restrain the second telescoping member and the third telescoping member from sliding relative to each other or disengaging from the third telescoping member to allow the second telescoping member and the third telescoping member to slide relative to each other. The operating member is connected to the first engaging assembly and the second engaging assembly for driving the first engaging assembly to disengage from the second telescoping member and for driving the second engaging assembly to disengage from the third telescoping member simultaneously.

In summary, the present invention utilizes the operating member, the first linking member, and the second linking member for driving the first engaging assembly and the second engaging assembly simultaneously, so that relative sliding movement of the first telescoping member and the second telescoping member and relative sliding movement of the second telescoping member and the third telescoping member are allowed at the same time, which provides a convenient way to adjust an overall length of the load leg. Furthermore, the overall length of the load leg can be extended or shortened by sliding the first telescoping member, the second telescoping member, and the third telescoping member, which provides wide-range adjustment. Hence, the load leg of the child safety seat assembly of the present invention can be suitable for various kinds of vehicles.

These and other objectives of the present invention will no doubt become obvious to those of ordinary skill in the art after reading the following detailed description of the preferred embodiment that is illustrated in the various figures and drawings.

DETAILED DESCRIPTION

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure (s) being described. The components of the present invention can be positioned in a number of different orientations. As such, the directional terminology is used for purposes of illustration and is in no way limiting. Accordingly, the drawings and descriptions will be regarded as illustrative in nature and not as restrictive.

Figure 1:
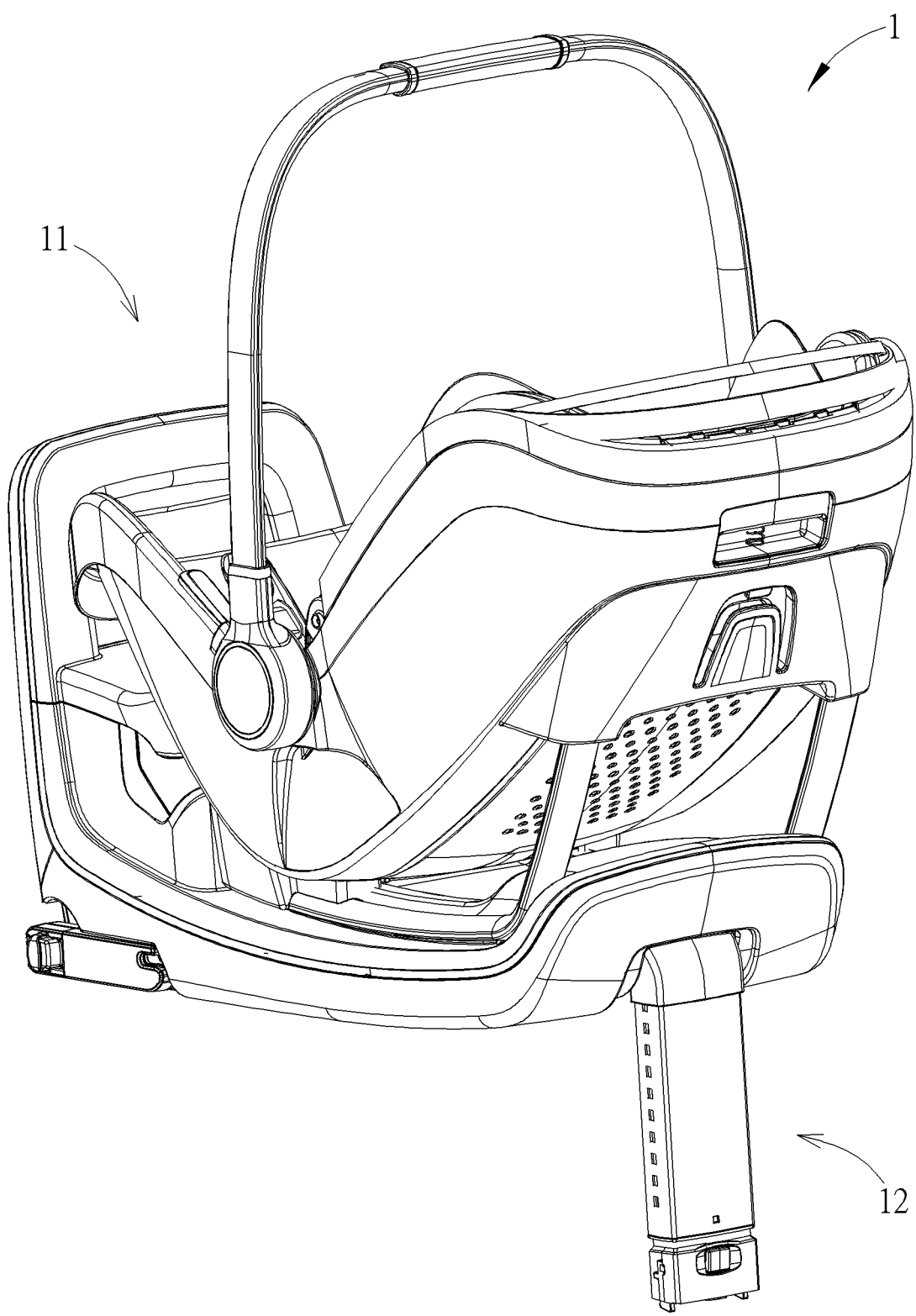
FIG. 1 is a schematic diagram of a child safety seat assembly according to a first embodiment of the present invention.
Figure 2:
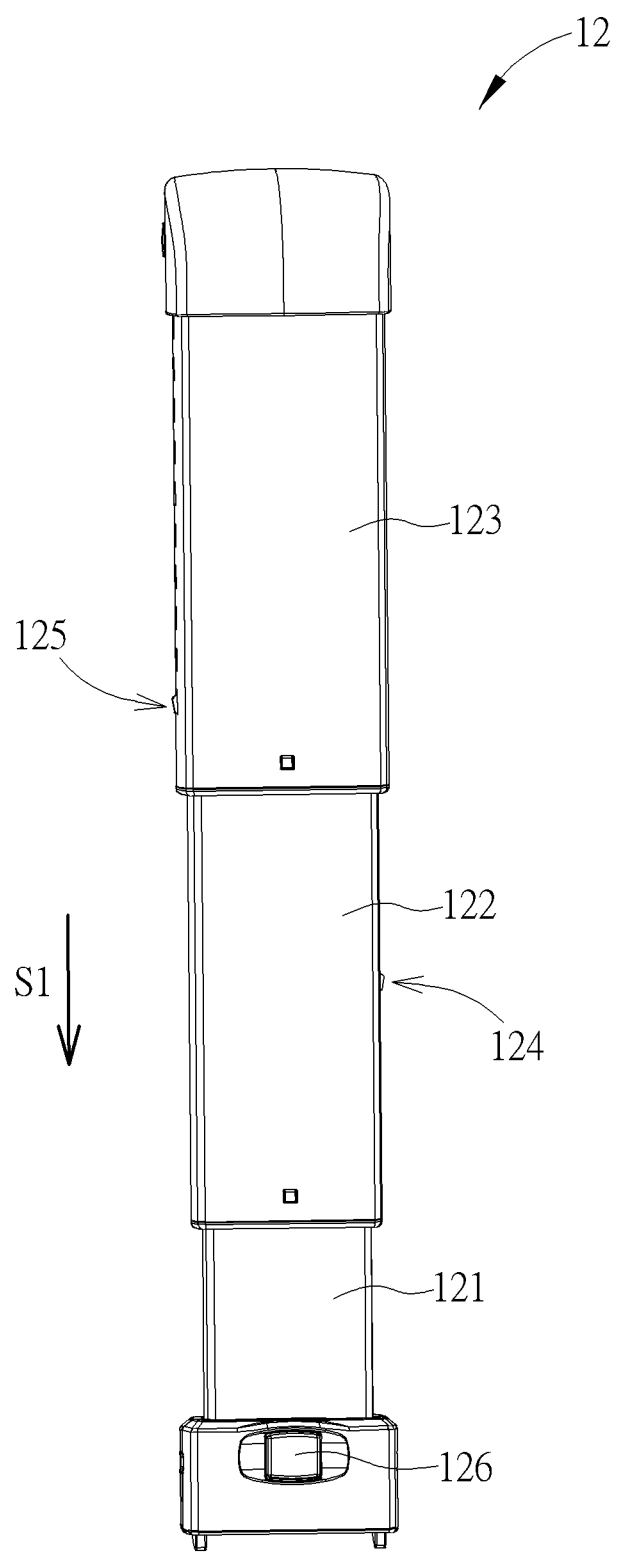
FIG. 2 and FIG. 3 are diagrams of a load leg at different views according to the first embodiment of the present invention.
Figure 3:
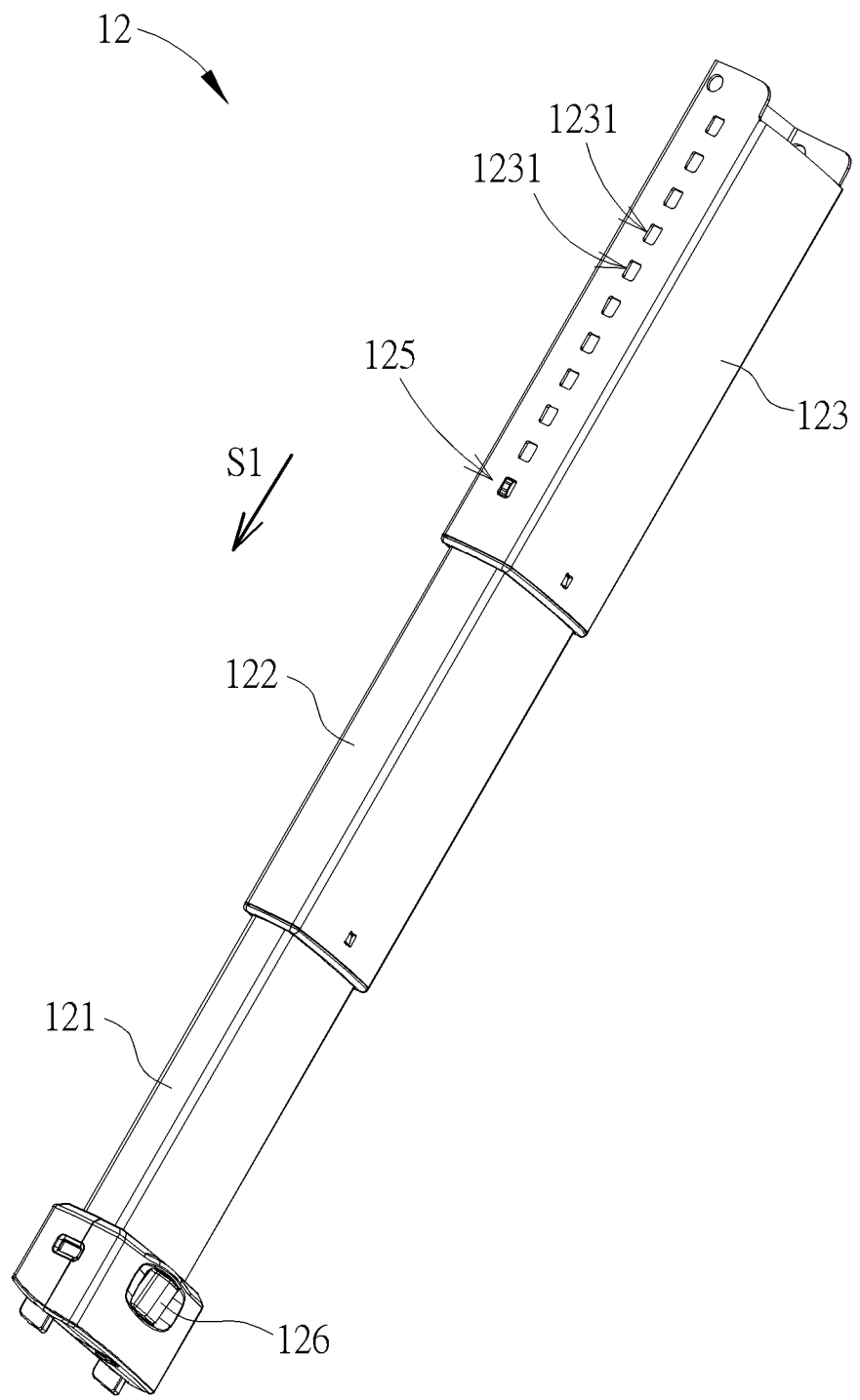
Figure 4:
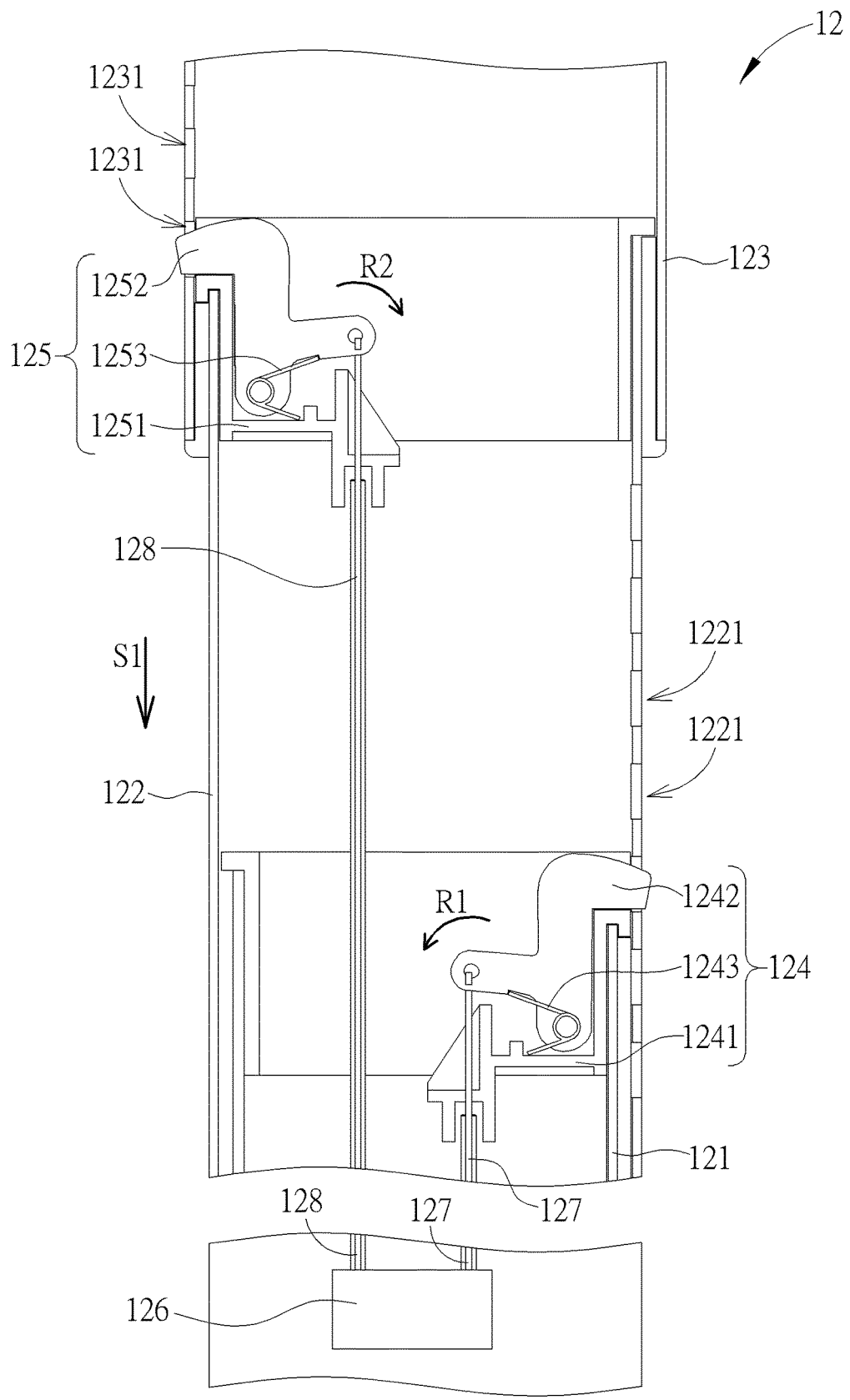
FIG. 4 is a partial enlarged internal structural diagram of the load leg according to the first embodiment of the present invention.

Please refer to FIG. 1 to FIG. 4. FIG. 1 is a schematic diagram of a child safety seat assembly 1 according to a first embodiment of the present invention. FIG. 2 and FIG. 3 are diagrams of a load leg 12 at different views according to the first embodiment of the present invention. FIG. 4 is a partial enlarged internal structural diagram of the load leg 12 according to the first embodiment of the present invention. As shown in FIG. 1 to FIG. 4, the child safety seat assembly 1 includes a child safety seat 11 and the load leg 12. The load leg 12 can extend to a floor of a vehicle, which is not shown in figures, so as to support the child safety seat 11 for preventing forward movement and rotation of the child safety seat 11 when the child safety seat 11 is installed on the vehicle in a rear-facing position. The load leg 12 includes a first telescoping member 121, a second telescoping member 122, a third telescoping member 123, a first engaging assembly 124, a second engaging assembly 125, an operating member 126, a first linking member 127, and a second linking member 128. The first telescoping member 121 is for abutting against a grounding surface or the floor of the vehicle. The second telescoping member 122 is slidably disposed on the first telescoping member 121. The third telescoping member 123 is slidably disposed on the second telescoping member 122 and fixedly connected to the child safety seat 11. An overall length of the load leg 12 can be extended or shortened according to a distance between the child safety seat 11 and the floor of the vehicle by relative sliding movement of the first telescoping member 121 and the second telescoping member 122 and/or relative sliding movement of the second telescoping member 122 and the third telescoping member 123.

As shown in FIG. 2 to FIG. 4, the first engaging assembly 124 is movably disposed on the first telescoping member 121 for engaging with the second telescoping member 122 to restrain the first telescoping member 121 and the second telescoping member 122 from sliding relative to each other. On the other hand, the first engaging assembly 124 can be disengaged from the second telescoping member 122 to allow the first telescoping member 121 and the second telescoping member 122 to slide relative to each other. The second engaging assembly 125 is movably disposed on the second telescoping member 122 for engaging with the third telescoping member 123 to restrain the second telescoping member 122 and the third telescoping member 123 from sliding relative to each other. On the other hand, the second engaging assembly 125 can be disengaged from the third telescoping member 123 to allow the second telescoping member 122 and the third telescoping member 123 to slide relative to each other. The operating member 126 is connected to the first engaging assembly 124 by the first linking member 127 and connected to the second engaging assembly 125 by the second linking member 128, so that the operating member 126 can drive the first engaging assembly 124 to disengage from the second telescoping member 122 by the first linking member 127 and drive the second engaging assembly 125 to disengage from the third telescoping member 123 by the second linking member 128, simultaneously.

Specifically, in this embodiment, a plurality of first engaging portions 1221 is formed on the second telescoping member 122 and along a sliding direction of the second telescoping member 122. A plurality of second engaging portions 1231 is formed on the third telescoping member 123 and along a sliding direction of the third telescoping member 123. The first engaging assembly 124 includes a first housing 1241, a first engaging pawl 1242, and a first recovering member 1243. The first housing 1241 is fixed on the first telescoping member 121. The first engaging pawl 1242 is pivoted to the first housing 1241 and connected to the first linking member 127. The first recovering member 1243 abuts against the first engaging pawl 1242 for biasing the first engaging pawl 1242 to engage with one of the plurality of first engaging portions 1221 formed on the second telescoping member 122. Similarly, the second engaging assembly 125 includes a second housing 1251, a second engaging pawl 1252, and a second recovering member 1253. The second housing 1251 is fixed on the second telescoping member 122. The second engaging pawl 1252 is pivoted to the second housing 1251 and connected to the second linking member 128. The second recovering member 1253 abuts against the second engaging pawl 1252 for biasing the second engaging pawl 1252 to engage with one of the plurality of second engaging portions 1231 formed on the third telescoping member 123.

In this embodiment, the first linking member 127 and the second linking member 128 can be preferably two independent cables, and the first recovering member 1243 and the second recovering member 1253 can be preferably torsional springs sheathed on pivoting shafts of the first engaging pawl 1242 and the second engaging pawl 1252 respectively. However, it is not limited thereto. It depends on practical demands. Furthermore, the first engaging assembly 124 and the second engaging assembly 125 can be preferably located at two opposite sides, and the plurality of first engaging portions 1221 and the plurality of second engaging portions 1231 can be preferably located at two opposite sides and in positions corresponding to the first engaging pawl 1242 and the second engaging pawl 1252 respectively. However, it is not limited thereto. In another embodiment, the first engaging assembly 124 and the second engaging assembly 125 also can be located at the same side, and the plurality of first engaging portions 1221 and the plurality of second engaging portions 1231 also can be located at the same side and in positions corresponding to the first engaging pawl 1242 and the second engaging pawl 1252 respectively.

Operational principle of the load leg 12 is described as follows. As shown in FIG. 1 to FIG. 4, when it is desired to adjust the overall length of the load leg 12 according to the distance between the child safety seat 11 and the floor of the vehicle, the operating member 126 can be pressed to pull the first linking member 127 and the second linking member 128 along a first direction S1 simultaneously. In such a way, the first engaging pawl 1242 is driven to pivot along a first pivoting direction R1 to disengage from one of the plurality of first engaging portions 1221 on the second telescoping member 122 and to compress the first recovering member 1243 by the first linking member 127, and the second engaging pawl 1252 is driven to pivot along a second pivoting direction R2 opposite to the first pivoting direction R1 to disengage from one of the plurality of second engaging portions 1231 on the third telescoping member 123 and to compress the second recovering member 1253 by the second linking member 128. At this moment, the first telescoping member 121 and the second telescoping member 122 are allowed to slide relative to each other due to disengagement of the first engaging pawl 1242 and the one of the plurality of first engaging portions 1221, and the second telescoping member 122 and the third telescoping member 123 are allowed to slide relative to each other due to disengagement of the second engaging pawl 1252 and the one of the plurality of second engaging portions 1231. Therefore, the overall length of the load leg 12 can be extended or shortened easily by the relative sliding movement of the first telescoping member 121 and the second telescoping member 122 and/or the relative sliding movement of the second telescoping member 122 and the third telescoping member 123.

After adjustment of the first telescoping member 121, the second telescoping member 122 and the third telescoping member 123, the operating member 126 can be released, so that the compressed first recovering member 1243 and the compressed second recovering member can drive the first engaging pawl 1242 and the second engaging pawl 1252 to engage with another one of the plurality of first engaging portions 1221 and another one of the plurality of second engaging portions 1231 respectively. At this moment, the first telescoping member 121 and the second telescoping member 122 are restrained from sliding relative to each other due to engagement of the first engaging pawl 1242 and the another one of the plurality of first engaging portions 1221, and the second telescoping member 122 and the third telescoping member 123 are restrained from sliding relative to each other due to engagement of the second engaging pawl 1252 and the another one of the plurality of second engaging portions 1231. Therefore, the overall length of the load leg 12 is fixed.

Figure 5:
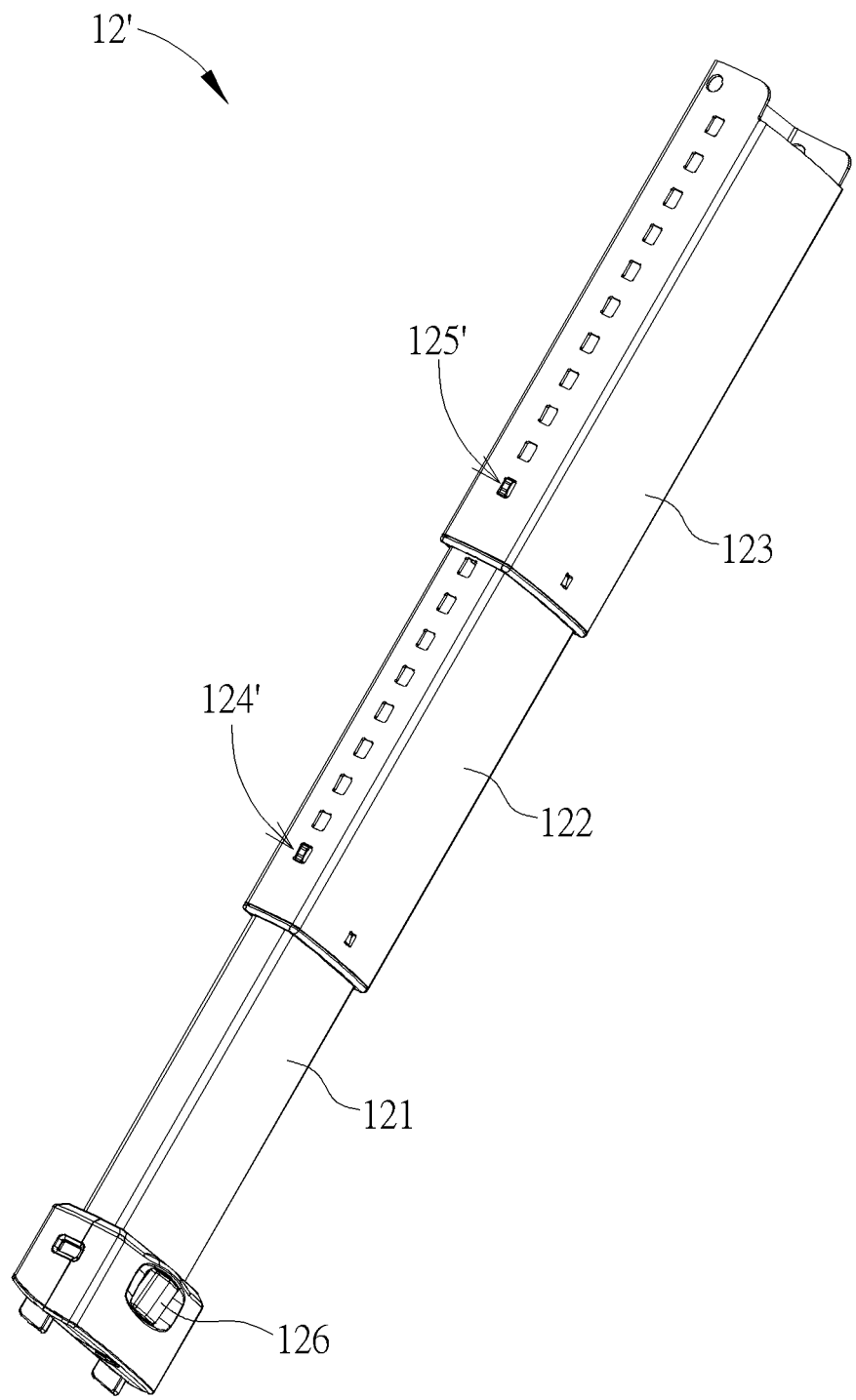
FIG. 5 is a schematic diagram of a load leg according to a second embodiment of the present invention.
Figure 6:
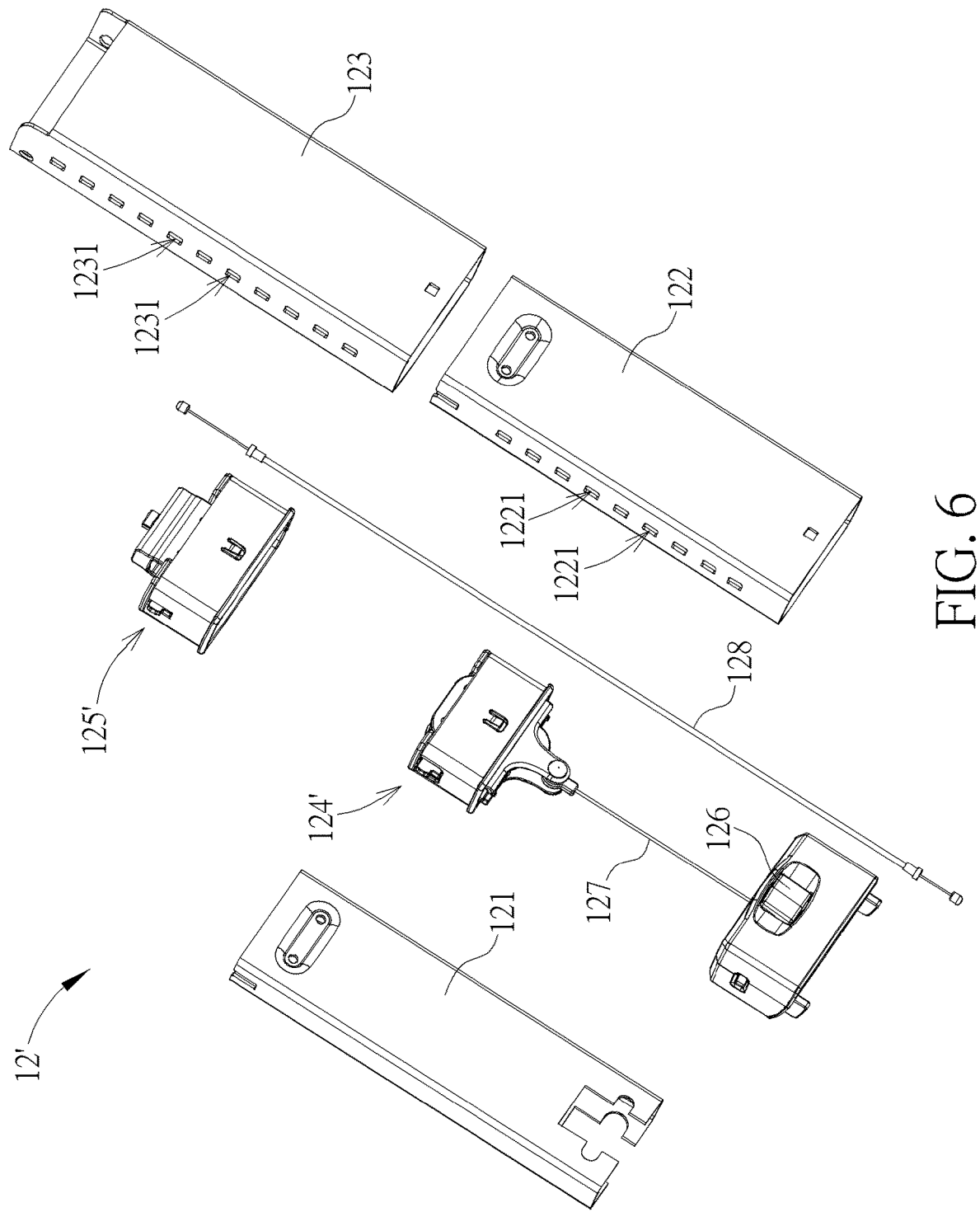
FIG. 6 is an exploded diagram of the load leg according to the second embodiment of the present invention.
Figure 7:
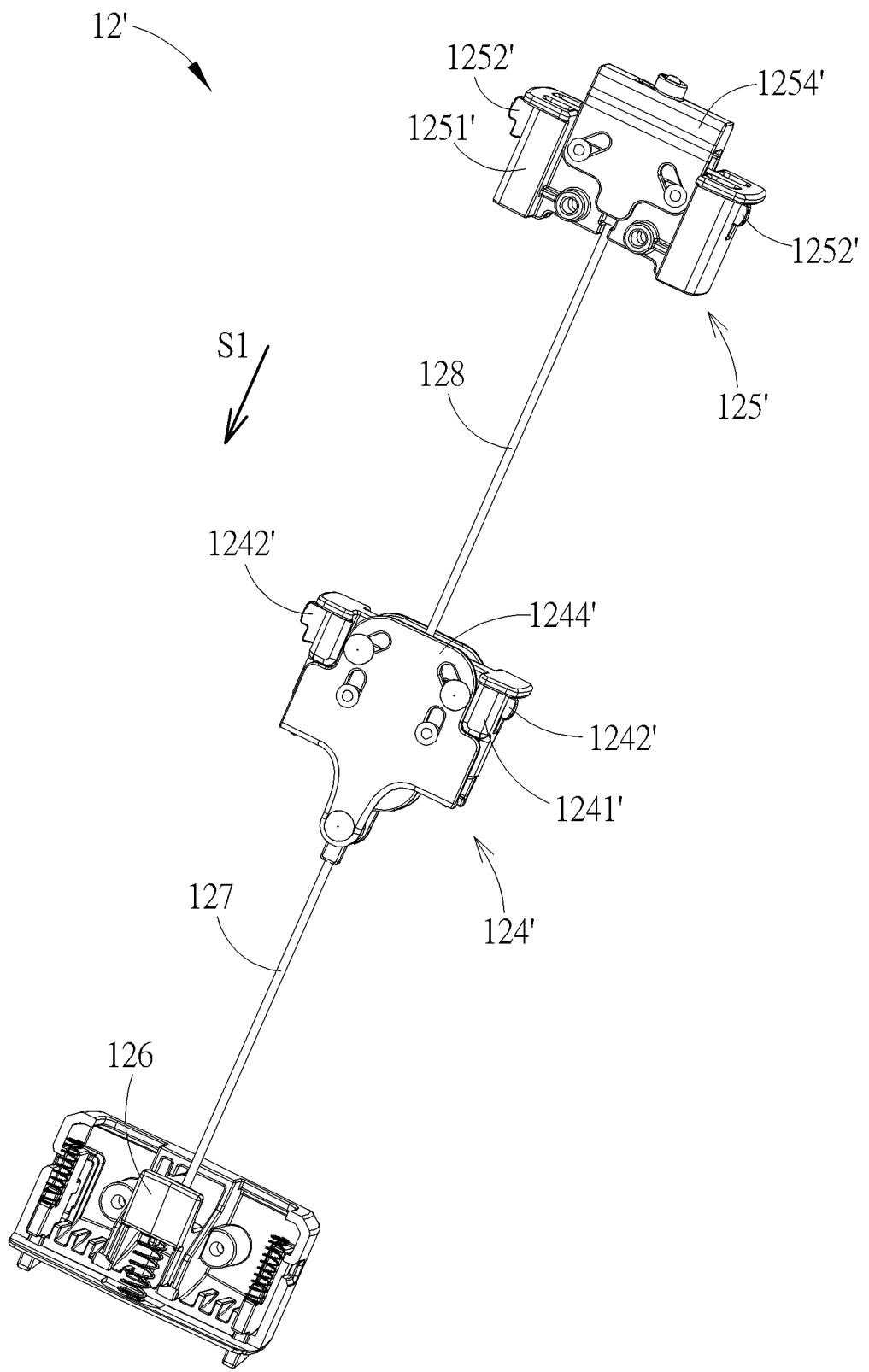
FIG. 7 is a partial internal structural diagram of the load leg according to the second embodiment of the present invention.
Figure 8:
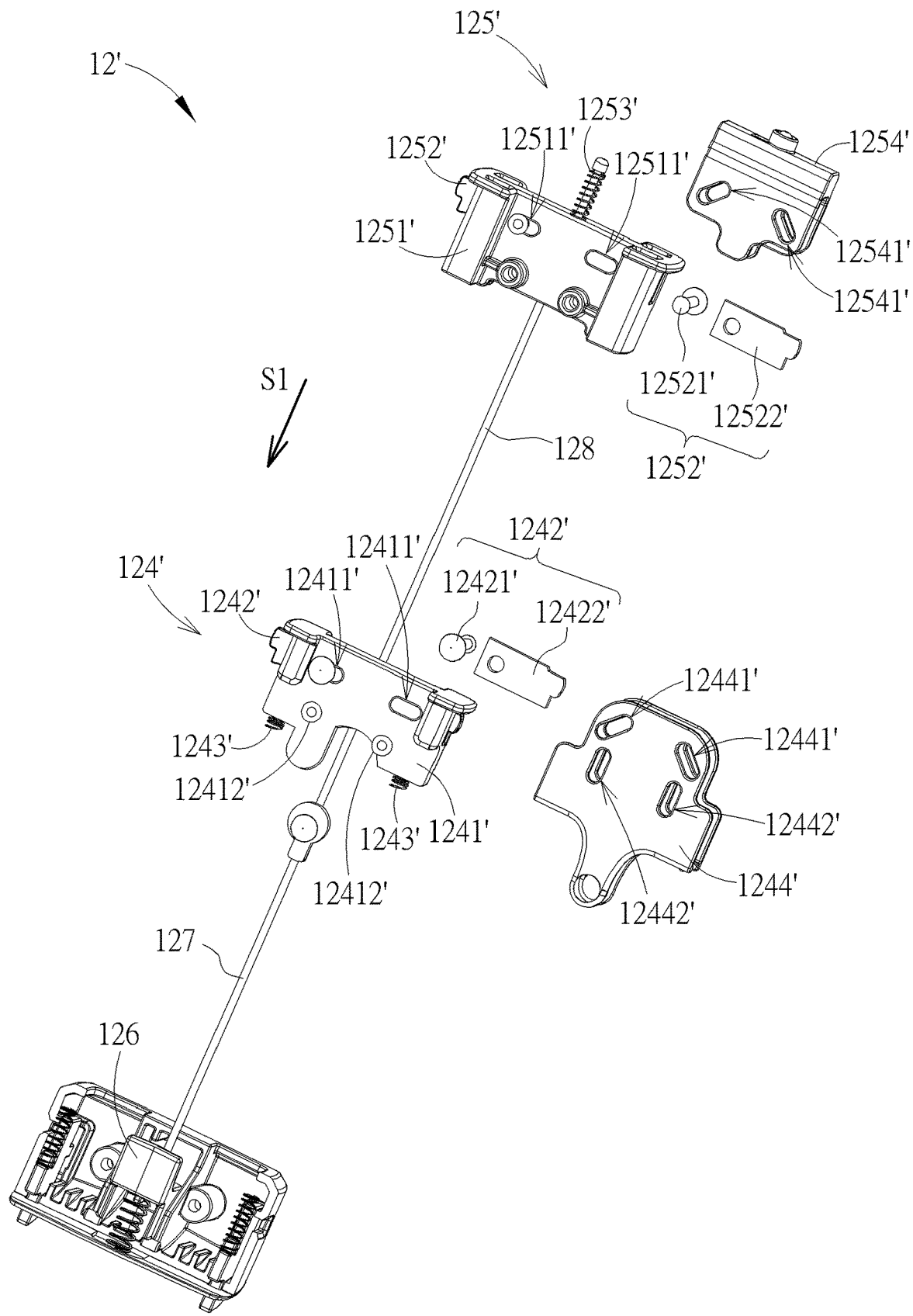
FIG. 8 is a partial exploded diagram of the load leg shown in FIG. 7 according to the second embodiment of the present invention.

Please refer to FIG. 5 to FIG. 8. FIG. 5 is a schematic diagram of a load leg 12' according to a second embodiment of the present invention. FIG. 6 is an exploded diagram of the load leg 12' according to the second embodiment of the present invention. FIG. 7 is a partial internal structural diagram of the load leg 12' according to the second embodiment of the present invention. FIG. 8 is a partial exploded diagram of the load leg 12' shown in FIG. 7 according to the second embodiment of the present invention. As shown in FIG. 5 to FIG. 8, different from the load leg 12 of the first embodiment, a first engaging assembly 124' of the load leg 12' of the second embodiment includes a first housing 1241', two first engaging pawls 1242', two first recovering members 1243', and a first driving member 1244'. The first housing 1241' is fixed on the first telescoping member 121. The two first engaging pawls 1242' are disposed on the first housing 1241' and slidable relative to the first housing 1241' along a direction substantially perpendicular to the sliding direction of the second telescoping member 122. The first driving member 1244' is connected to the first linking member 127 and slidable relative to the first housing 1241' along the sliding direction of the second telescoping member 122 for driving the two first engaging pawls 1242'. The plurality of the first engaging portions 1221 are formed on two sides of the second telescoping member 122 and located in positions corresponding to the two first engaging pawls 1242'.

Specifically, two first sliding slots 12411' are formed on the first housing 1241'. A longitudinal direction of each of the two first sliding slots 12411' is substantially perpendicular to the sliding direction of the second telescoping member 122. Two first driving slots 12441' are formed on the first driving member 1244'. A longitudinal direction of each of the two first driving slots 12441' is inclined relative to the longitudinal direction of the first sliding slot 12411', and the two first driving slots 12441' are not parallel with each other and can be substantially arranged in a V shape. Each of the two first engaging pawls 1242' includes a first protruding column 12421' and a first pawl portion 12422'. Each of the two first pawl portions 12422' is connected to the corresponding first protruding column 12421' and for selectively engaging with one of the plurality of first engaging portions 1221 on the second telescoping member 122. Each of the two first protruding columns 12421' passes through the corresponding first driving slot 12441' and the corresponding first sliding slot 12411'. The two first recovering members 1243' are connected between the first housing 1241' and the first driving member 1244' for biasing the first driving member 1244' to recover.

Similarly, a second engaging assembly 125' of the load leg 12' of the second embodiment includes a second housing 1251', two second engaging pawls 1252', a second recovering member 1253', and a second driving member 1254'. The second housing 1251' is fixed on the second telescoping member 122. The two second engaging pawls 1252' are disposed on the second housing 1251' and slidable relative to the second housing 1241' along a direction substantially perpendicular to the sliding direction of the third telescoping member 123. The second driving member 1254' is connected to the second linking member 128 and slidable relative to the second housing 1251' along the sliding direction of the third telescoping member 123 for driving the two second engaging pawls 1252'. The plurality of the second engaging portions 1231 are formed on two sides of the third telescoping member 123 and located in positions corresponding to the two second engaging pawls 1252'.

Specifically, two second sliding slots 12511' are formed on the second housing 1251' A longitudinal direction of each of the two second sliding slots 12511' is substantially perpendicular to the sliding direction of the third telescoping member 123. Two second driving slots 12541' are formed on the second driving member 1254'. A longitudinal direction of each of the two second driving slots 12541' is inclined relative to the longitudinal direction of the second sliding slot 12511', and the two second driving slots 12541' are not parallel with each other and can be substantially arranged in a V shape. Each of the second engaging pawls 1252' includes a second protruding column 12521' and a second pawl portion 12522', Each of the two second pawl portions 12522' is connected to the corresponding second protruding column 12521' and for selectively engaging with one of the plurality of second engaging portions 1231 on the third telescoping member 123. Each of the two second protruding columns 12521' passes through the corresponding second driving slot 12541' and the corresponding second sliding slot 12511'. The second recovering member 1253' is connected between the second housing 1251' and the second driving member 1254'. However, the configurations of the first engaging assembly 124' and the second engaging assembly 125' are not limited to this embodiment. In another embodiment, the first engaging assembly 124' can include only one first engaging pawl 1242', and the second engaging assembly 125' can include only one second engaging pawl 1252'. It depends on practical demands.

Preferably, in this embodiment, two guiding slots 12442' are formed on the first driving member 1244' and arranged along the first direction S1, and the first housing 1241' includes two guiding pins 12412'. By cooperation of the two guiding slots 12442' and the two guiding pins 12412', the first driving member 1244' can be guided to move relative to the first housing 1241' along the first direction S1.

As shown in FIG. 5 to FIG. 8, when it is desired to adjust the overall length of the load leg 12', the operating member 126 can be pressed to drive the first driving member 1244' and the second driving member 1254' to move along the first direction S1 simultaneously by pulling the first linking member 127 and the second linking member 128 along the first direction S1 respectively. When the first driving member 1244' is moved along the first direction S1, the first protruding columns 12421' are driven to move inwardly and close to each other along the first sliding slots 12411' by oblique and inward movement of the first protruding columns 12421' along the oblique first driving slots 12441'. Similarly, when the second driving member 1254' is moved along the first direction S1, the second protruding columns 12521' are driven to move inwardly and close to each other along the second sliding slots 12511' by oblique and inward movement of the second protruding columns 12521' along the oblique second driving slots 12541'. In such a way, the first driving member 1244' drives the two first pawl portions 12422' to disengage from the corresponding first engaging portions 1221 by cooperation of the first protruding columns 12421', the first sliding slots 12411', and the first driving slots 12441', and the second driving member 1254' drives the two second pawl portions 12522' to disengage from the corresponding second engaging portions 1231 by cooperation of the second protruding columns 12521', the second sliding slots 12511', and the second driving slots 12541'.

At this moment, the first telescoping member 121 and the second telescoping member 122 are allowed to slide relative to each other due to disengagement of the two first pawl portions 12422' and the corresponding first engaging portions 1221, and the second telescoping member 122 and the third telescoping member 123 are allowed to slide relative to each other due to disengagement of the second pawl portions 12522' and the corresponding second engaging portions 1231, which is convenient for a user to adjust the overall length of the load leg 12'.

When it is desired to fix the overall length of the load leg 12' after adjustment of the first telescoping member 121, the second telescoping member 122 and the third telescoping member 123, the operating member 126 can be released, so that the extended first recovering member 1243' and the compressed second recovering member 1253' can recover the first driving member 1244' and the second driving member 1254' to drive the first pawl portions 12422' and the second pawl portions 12522' to engage with the corresponding first engaging portions 1221 and the corresponding second engaging portions 1231 respectively. Therefore, the overall length of the load leg 12 is fixed.

In contrast to the prior art, the present invention utilizes the operating member, the first linking member, and the second linking member for driving the first engaging assembly and the second engaging assembly simultaneously, so that the relative sliding movement of the first telescoping member and the second telescoping member and the relative sliding movement of the second telescoping member and the third telescoping member are allowed at the same time, which provides a convenient way to adjust the overall length of the load leg. Furthermore, the overall length of the load leg can be extended or shortened by sliding the first telescoping member, the second telescoping member, and the third telescoping member, which provides wide-range adjustment. Hence, the load leg of the child safety seat assembly of the present invention can be suitable for various kinds of vehicles.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A load leg adapted for a child safety seat, the load leg comprising:
   a first telescoping member for abutting against a grounding surface;
   a second telescoping member slidably disposed on the first telescoping member;
   a third telescoping member slidably disposed on the second telescoping member and fixedly connected to the child safety seat;
   a first engaging assembly movably disposed on the first telescoping member for engaging with second telescoping member to restrain the first telescoping member and the second telescoping member from sliding relative to each other or disengaging from the second telescoping member to allow the first telescoping member and the second telescoping member to slide relative to each other;
   a second engaging assembly movably disposed on the second telescoping member for engaging with third telescoping member to restrain the second telescoping member and the third telescoping member from sliding relative to each other or disengaging from the third telescoping member to allow the second telescoping member and the third telescoping member to slide relative to each other; and
   an operating member connected to the first engaging assembly and the second engaging assembly for driving the first engaging assembly to disengage from the second telescoping member and for driving the second engaging assembly to disengage from the third telescoping member simultaneously.

2. The load leg of claim 1, wherein the first engaging assembly and the second engaging assembly are misaligned with each other along a direction substantially perpendicular to sliding directions of the second telescoping member and the third telescoping member.

3. The load leg of claim 1, further comprising a first linking member and a second linking member, the operating member being connected to the first engaging assembly by the first linking member, and the operating member being connected to the second engaging assembly by the second linking member.

4. The load leg of claim 3, wherein the first linking member and the second linking member are cables.

5. The load leg of claim 3, wherein the first engaging assembly comprises a first housing and a first engaging pawl, the first housing is fixed on the first telescoping member, the first engaging pawl is pivoted to the first housing and connected to the first linking member, the second engaging assembly comprises a second housing and a second engaging pawl, the second housing is fixed on the second telescoping member, and the second engaging pawl is pivoted to the second housing and connected to the second linking member.

6. The load leg of claim 5, wherein a plurality of first engaging portions is formed on the second telescoping member and along a sliding direction of the second telescoping member, a plurality of second engaging portions is formed on the third telescoping member and along a sliding direction of the third telescoping member, the operating member drives the first engaging pawl to pivotally disengage from one of the plurality of first engaging portions on the second telescoping member and drives the second engaging pawl to pivotally disengage from one of the plurality of second engaging portions on the third telescoping member simultaneously.

7. The load leg of claim 6, wherein the first engaging assembly and the second engaging assembly are located at two opposite sides, and the plurality of first engaging portions and the plurality of second engaging portions are located at two opposite sides.

8. The load leg of claim 7, wherein the first engaging assembly further comprises a first recovering member abutting against the first engaging pawl for biasing the first engaging pawl to engage with the one of the plurality of first engaging portions formed on the second telescoping member, and the second engaging assembly further comprises a second recovering member abutting against the second engaging pawl for biasing the second engaging pawl to engage with the one of the plurality of second engaging portions formed on the third telescoping member.

9. The load leg of claim 3, wherein the first engaging assembly comprises a first housing, a first driving member, and a first engaging pawl, the first housing is fixed on the first telescoping member, the first driving member is connected to the first linking member, a first sliding slot is formed on the first housing, a longitudinal direction of the first sliding slot is substantially perpendicular to a sliding direction of the second telescoping member, a first driving slot is formed on the first driving member, a longitudinal direction of the first driving slot is inclined relative to the longitudinal direction of the first sliding slot, and the first engaging pawl comprises a first protruding column passing through the first driving slot and the first sliding slot and a first pawl portion connected to the first protruding column.

10. The load leg of claim 9, wherein the second engaging assembly comprises a second housing, a second driving member, and a second engaging pawl, the second housing is fixed on the second telescoping member, the second driving member is connected to the second linking member, a second sliding slot is formed on the second housing, a longitudinal direction of the second sliding slot is substantially perpendicular to a sliding direction of the third telescoping member, a second driving slot is formed on the second driving member, a longitudinal direction of the second driving slot is inclined relative to the longitudinal direction of the second sliding slot, and the second engaging pawl comprises a second protruding column passing through the second driving slot and the second sliding slot and a second pawl portion connected to the second protruding column.

11. The load leg of claim 10, wherein a plurality of first engaging portions is formed on the second telescoping member and along a sliding direction of the second telescoping member, a plurality of second engaging portions is formed on the third telescoping member and along a sliding direction of the third telescoping member, the operating member drives the first engaging pawl to pivotally disengage from one of the plurality of first engaging portions on the second telescoping member and drives the second engaging pawl to pivotally disengage from one of the plurality of second engaging portions on the third telescoping member simultaneously.

12. The load leg of claim 11, wherein the first engaging assembly further comprises a first recovering member connected between the first housing and the first driving member, and the second engaging assembly further comprises a second recovering member connected between the second housing and the second driving member.

13. The load leg of claim 1, wherein the operating member is disposed on the first telescoping member.

14. A child safety seat assembly comprising:
a child safety seat; and
a load leg for supporting the child safety seat, the load leg comprising:
  a first telescoping member for abutting against a grounding surface;
  a second telescoping member slidably disposed on the first telescoping member;
  a third telescoping member slidably disposed on the second telescoping member and fixedly connected to the child safety seat;
  a first engaging assembly movably disposed on the first telescoping member for engaging with second telescoping member to restrain the first telescoping member and the second telescoping member from sliding relative to each other or disengaging from the second telescoping member to allow the first telescoping member and the second telescoping member to slide relative to each other;
  a second engaging assembly movably disposed on the second telescoping member for engaging with third telescoping member to restrain the second telescoping member and the third telescoping member from sliding relative to each other or disengaging from the third telescoping member to allow the second telescoping member and the third telescoping member to slide relative to each other; and
  an operating member connected to the first engaging assembly and the second engaging assembly for driving the first engaging assembly to disengage from the second telescoping member and for driving the second engaging assembly to disengage from the third telescoping member simultaneously.

\* \* \* \* \*